United States Patent [19]
Yamada et al.

[11] Patent Number: 5,945,219
[45] Date of Patent: Aug. 31, 1999

[54] MAGNETIC RECORDING MEDIUM AND METHOD FOR PRODUCING SAME

[75] Inventors: Yukari Yamada; Ryoichi Hiratsuka; Takahiro Kawana, all of Miyagi, Japan

[73] Assignee: Sony Corporation, Tokyo, Japan

[21] Appl. No.: 08/621,620

[22] Filed: Mar. 26, 1996

[30] Foreign Application Priority Data

| Mar. 31, 1995 | [JP] | Japan | 7-075378 |
| Mar. 31, 1995 | [JP] | Japan | 7-075379 |
| Aug. 30, 1995 | [JP] | Japan | 7-221769 |

[51] Int. Cl.$^6$ ................................................. G11B 05/72
[52] U.S. Cl. ................. 428/408; 428/457; 428/694 TC; 428/694 TP; 428/900; 427/130; 427/131; 427/577; 204/192.15; 204/192.16
[58] Field of Search .................... 428/408, 457, 428/694 TC, 694 TP, 900; 204/192.15, 192.16; 427/577, 130, 131

[56] References Cited

U.S. PATENT DOCUMENTS

| 4,735,848 | 4/1988 | Kodo et al. ................... 428/219 |
| 4,833,031 | 5/1989 | Kurokawa et al. ............ 428/336 |
| 5,110,676 | 5/1992 | Murai et al. .................. 428/336 |
| 5,275,850 | 1/1994 | Kitoh et al. .................. 427/577 |

FOREIGN PATENT DOCUMENTS 03260908  11/1991  Japan .

OTHER PUBLICATIONS

Patent Abstracts of Japan, vol. 12, No. 309 (p–748), Aug. 23, 1988 and JP–A–63 079230 (Fuji Electric Co., Ltd.), Apr. 9, 1988.

*Primary Examiner*—Stevan A. Resan
*Attorney, Agent, or Firm*—Hill & Simpson

[57] ABSTRACT

A magnetic recording medium having at least a thin magnetic metal film and a carbon protective film formed on a non-magnetic substrate, wherein lubricating properties are afforded to a surface portion of the carbon protective film. Specifically, the carbon protective film having a lower layer exhibiting rust-proofing properties and/or an upper layer exhibiting lubricating properties is formed on the thin magnetic metal film. The magnetic recording medium has a good running performance, durability and preservability.

30 Claims, 4 Drawing Sheets

MAGNETIC RECORDING MEDIUM AND METHOD FOR PRODUCING SAME

BACKGROUND OF THE INVENTION

This invention relates to a thin magnetic metal film type recording medium and, more particularly, to an improvement in a protective film employed therein.

As a magnetic tape, such as an audio tape or a video tape, a so-called coated magnetic recording medium, produced by application of a magnetic paint on a non-magnetic recording medium followed by drying in situ, is in extensive use. The magnetic paint, in turn, is produced by dispersing powdered magnetic materials, such as powders of magnetic oxides or alloys, and an organic binder, in an organic solvent, and kneading the resulting product.

On the other hand, with increasing demand for high density magnetic recording, a so-called thin magnetic metal film type magnetic recording medium, in which a magnetic layer is formed by directly depositing a magnetic metal material, such as Co—Ni alloys, Co—Cr alloys or Co—O on a non-magnetic substrate by plating or vacuum thin-film forming means, such as vacuum deposition, sputtering or ion plating, has been proposed and attracted attention.

The thin magnetic metal film type magnetic recording medium suffers from recording demagnetization or loss in thickness on reproduction to a significantly lesser extent and is superior in electro-magnetic conversion properties for short wavelengths since it is superior in coercivity and rectangular ratio and its magnetic layer can be reduced in thickness. In addition, since there is no necessity of mixing the binder as a non-magnetic material in the magnetic layer, it is possible to raise packing density of the magnetic material. Thus there is a favorable prospect for the thin magnetic metal film type magnetic recording medium as a recording medium for high density magnetic recording due to its ascendancy in magnetic properties.

In particular, an oblique deposition type magnetic recording medium, in which a magnetic layer has been formed by vacuum depositing a magnetic metal material from an oblique direction has already been put to practical use since it is superior in electro-magnetic conversion characteristics and is capable of producing a higher playback output.

The thin magnetic metal film type magnetic recording medium, thus produced by forming a thin magnetic metal film as a magnetic layer on a non-magnetic substrate, is usually provided further with a carbon protective layer, a lubricant or a rust-proofing agent on the magnetic layer for producing durability, good running performance and preservability. Of these, the lubricant and the rust-proofing agent are provided by dissolving these in respective solvents to produce a lubricant paint and a paint of the rust-proofing agent and top-coating the respective paints on the surface of the protective layer by a dipping method.

However, the lubricant or the rust-proofing agent, thus top-coated on the surface of the underlaying layer, tends to be lost due to sliding contact with various sliding components, such that lubricating and rust-proofing properties cannot be maintained without difficulties for prolonged tome on the recording medium. In addition, if the rust-proofing material, mainly employed for preventing rusting of the thin magnetic metal film, is top-coated on the protective layer, it is not directly contacted with the thin magnetic metal layer, so that it is unable to prohibit rusting of the magnetic metal film satisfactorily.

SUMMARY OF THE INVENTION

It is therefore an object of the present invention to provide a magnetic recording medium in which the lubricating and rust-proofing properties may be maintained for prolonged time and superior durability, running performance and preservability may be developed.

It is another object of the present invention to provide a method for producing a method for producing a magnetic recording medium without a production step in which solvents are employed.

The present invention is applied to the thin magnetic metal film type magnetic recording medium in which a thin magnetic metal film is formed on the non-magnetic substrate.

With such thin magnetic metal film type magnetic recording medium, a carbon protective film is provided on the thin magnetic metal film. With the magnetic recording medium of the present invention, lubricating properties are accorded to the surface layer portion of the carbon protective film, or rust-proofing properties are accorded to the portion of the carbon protective film contacted with the thin magnetic metal film.

It is also possible to accord lubricating properties and rust-proofing properties to the surface layer portion and the portion contacted with the thin magnetic metal film of the carbon protective film.

It is likewise possible to provide an intermediate carbon layer between the surface layer portion endowed with lubricating properties and the portion endowed with the rust-proofing properties.

The carbon protective film having such lubricating properties and rust-proofing properties is formed by CVD. That is, the carbon film having lubricating properties is formed by forming a thin film by CVD as a gasified lubricant is introduced into a starting gas of the carbon protective film. On the other hand, the carbon film having rust-proofing properties is formed by forming a thin film by CVD as a gasified rust-proofing agent is introduced into a starting gas of the carbon protective film.

It is possible with the recording medium of the present invention to achieve good running performance, durability and preservability since the carbon protective film having the lower layer exhibiting rust-proofing properties and/or the upper layer exhibiting lubricating properties is formed on the thin magnetic metal film.

In addition, since the process step of coating a rust-proofing agent and the lubricant by dipping may be eliminated in manufacture, it becomes possible to evade various inconveniences resulting from use of solvents, thus contributing to simplification of production of recording media.

DESCRIPTION OF THE PREFERRED EMBODIMENTS

Figure 1:
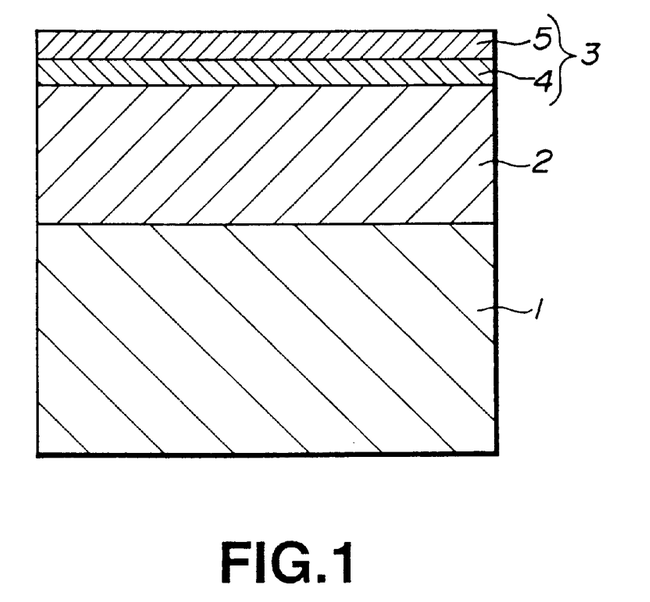
FIG. 1 is a schematic cross-sectional view showing an illustrative arrangement of a magnetic recording medium according to the present invention.

The magnetic recording medium of the present invention has a thin magnetic metal film 2 formed on a non-magnetic substrate 1 and a carbon protective film 3 on the thin magnetic metal film 2, as shown in FIG. 1.

The carbon protective layer 3 is divided into a lower layer 4 directly contacted with the thin magnetic metal film 2 and an upper layer or a superficial layer 5 disposed on the lower layer. The lower layer 4 and the upper layer 5 are endowed with rust-proofing properties and with lubricating properties, respectively. Although an example consisting in a combination of the lubricating and rust-proofing properties is explained herein, only one of these two functions suffices.

With the magnetic recording medium, in which the rust-proofing and lubricating properties are directly accorded to the carbon protective film 3, the rust-proofing and lubricating properties are scarcely damaged due to sliding against a variety of sliding components during recording/reproduction, in contradistinction from a magnetic recording medium in which the rust-proofing agent and the lubricant are top-coated by dipping. In addition, since the lower layer 4 endowed with the rust-proofing properties is directly contacted with the thin magnetic metal layer 2, the thin magnetic metal layer 2 may be effectively prohibited from rusting by the rust-proofing properties of the lower layer 4, thus assuring superior running performance, durability and preservability.

Figure 2:
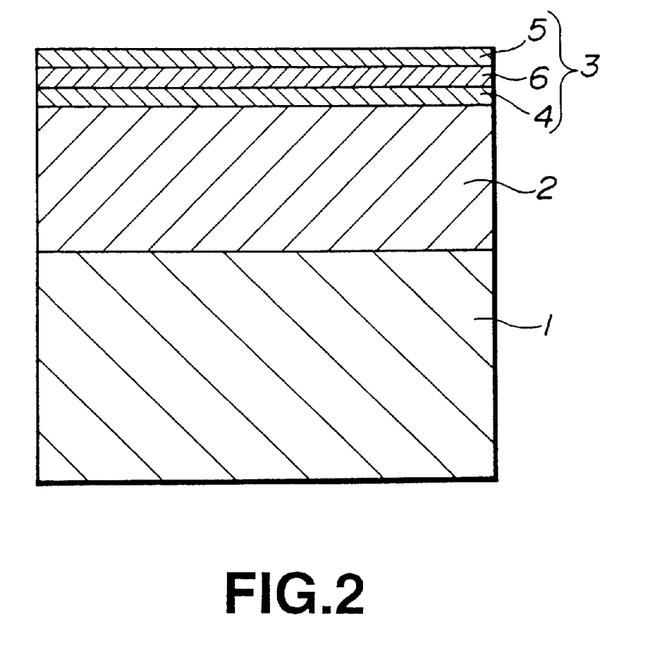
FIG. 2 is a schematic cross-sectional view showing another illustrative arrangement of a magnetic recording medium according to the present invention.

With the carbon protective layer 3, a pure carbon layer 6 (intermediate carbon layer) not having the rust-proofing and lubricating properties may be interposed between the lower layer 4 having the rust-proofing properties and the upper layer 5 having the lubricating properties, as shown in FIG. 2. This assures increased hardness and improved durability of the protective layer 3.

The carbon protective film 3, thus endowed with the rust-proofing and lubricating properties, may be formed by CVD by introducing a lubricant and a rust-proofing agent into a film-forming gas.

Figure 3:
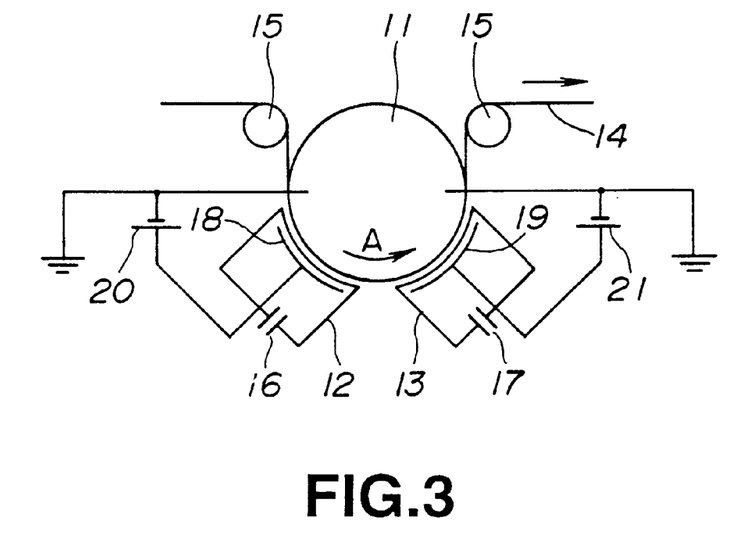
FIG. 3 is a schematic view showing an example of a CVD device for forming a carbon protective layer.

FIG. 3 shows an example of a CVD apparatus for continuously forming the upper layer 4 having the rust-proofing properties and the upper layer 5 having the lubricating properties.

The CVD apparatus includes a vacuum chamber within which there are provided a cooling can 11, a reaction tube 12 for the lower layer 4 and another reaction tube 13 for the lower layer 5.

The cooling can 11 is cylindrically-shaped and adapted for being rotated clockwise in the drawing at a constant velocity. An article being processed, that is a non-magnetic substrate 14, having the thin magnetic metal layer 2 formed thereon, travels continuously on the side of the thin magnetic metal layer 2 towards the reaction tube along the periphery of the cooling can 11. The cooling can has the cooling function for prohibiting the substrate 14 running therearound from becoming thermally deformed. On both sides of the cooling can are arranged guide rolls 15, 15 for applying pre-set tension for permitting smooth travel of the substrate 14.

The reaction tube 12 for the lower layer and the reaction tube 13 for the upper layer are provided in the vicinity of the cooling can 11 so that the tubes 12, 13 will be disposed on the substrate inlet side and on the substrate discharging side, respectively.

The sides of the reaction tubes 12, 13 facing the cooling can 11 are opened, while the opposite sides thereof are traversed by gas inlet tubes 16, 17 for introducing the film-forming gas int the reaction tubes. In mid portions of the reaction tubes 12, 13 are mounted discharge electrodes 18, 19 of wire meshes. These discharge electrodes 18, 19 are connected to dc electrodes 20, 21, arranged outside, so that an arbitrary voltage may be applied across the discharge electrodes. If an electrical voltage is applied across the discharge electrodes 18, 19, an electrical discharge occurs across the discharge electrodes and the cooling can 11.

For forming the carbon protective film by the above-described CVD apparatus, the non-magnetic substrate 14, having the thin magnetic metal layer 2 formed thereon, is placed around the guide roll 15, cooling can 11 and the guide roll 15, and is allowed to travel continuously in a direction indicated by arrow A in the drawing.

Into the reaction tube 12 for the lower layer and the reaction tube 13 for the upper layer are introduced a hydrocarbon gas containing a gasified rust-proofing agent and another hydrocarbon gas containing a gasified lubricant, respectively.

An electrical voltage is applied across the discharge electrodes 18 and 19 respectively mounted on the reaction tubes 12, 13 for producing a glow discharge between the discharge electrodes 18, 19 and the cooling can 11.

As the travelling substrate 14 traverses the reaction tube for the lower layer 12, reaction products, generated in the reaction tube 12 by reaction between the hydrocarbon compound and the rust-proofing agent within the reaction tube 12 is deposited on the thin magnetic metal layer 2 to form a CVD film thereon. The CVD film thus formed is composed mainly of carbon and endowed with rust-proofing properties proper to the rust-proofing agent.

As the substrate traverses the reaction tube for the upper layer 13, reaction products formed by decomposition of hydrocarbon compounds or the lubricant in the tube 13 are deposited on the lower layer to form a further CVD film. The further CVD film thus formed is composed mainly of carbon and endowed with lubricating properties proper to the lubricant.

By the above process, there is formed the carbon protective layer 3 comprised of the lower layer 4 and the upper layer 5 having rust-proofing and lubricating properties, respectively.

This method permits the rust-proofing and lubricating properties to be accorded to the protective film without using overmuch solvents to avoid various inconveniences otherwise caused by using the solvents for simplifying the production of the recording medium.

As rust-proofing agents contained in the hydrocarbon gas, aromatic hydroxy compounds, such as phenol, catechol, resorcin, hydroquinone, orcin, urushiol, pyrogallol, Phloroglucin, hydroxy hydroquinone, bisphenol A, naphthol, naphthalene diol, binaphthol, Antrol, anthrahydroquinines and modified products thereof may be employed in gasified states. Most preferred are catechol and naphthalene diol.

As lubricants, low boiling lubricants, such as tristearyl thiophosphite, trimyristyl thiophosphite, trilauryl thiophosphite, tribenzyl thiophosphite, tricresyl phosphite, trioleyl phosphite, tricresyl phosphate or perfluoro polyether, or siloxane, may also be employed in gasified states.

In preparing these gas mixtures, the rust-proofing agent or the lubricant is previously added in liquid state to the hydrocarbon compound and the resulting mass may be gasified in its entirety. Alternatively, the hydrocarbon compound on one hand and the rust-proofing agent or the lubricant on the other hand may be separately gasified and mixed together in gasified states.

The above-described CVD apparatus is configured for forming the carbon protective layer 3 made up of the upper layer 4 and the lower layer 5. If a three-layered carbon protective film 3, including the intermediate layer 6 between the upper layer 4 and the lower layer 5, a reaction tube for the intermediate layer may be arranged between the reaction tube 12 for the lower layer and the reaction tube 13 for the upper layer and the hydrocarbon gas alone is introduced into this reaction tube for the intermediate layer. In this case, a hard carbon layer having a diamond structure is formed on the lower layer having the rust-proofing properties, and the upper layer having the lubricating properties is further formed on this hard carbon layer.

Figure 4:
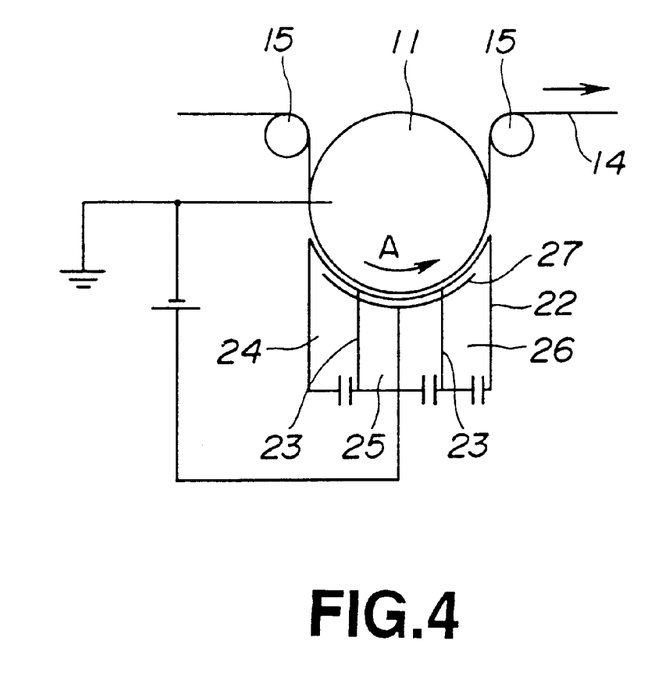
FIG. 4 is a schematic view showing another example of a CVD device for forming a carbon protective layer.
Figure 5:
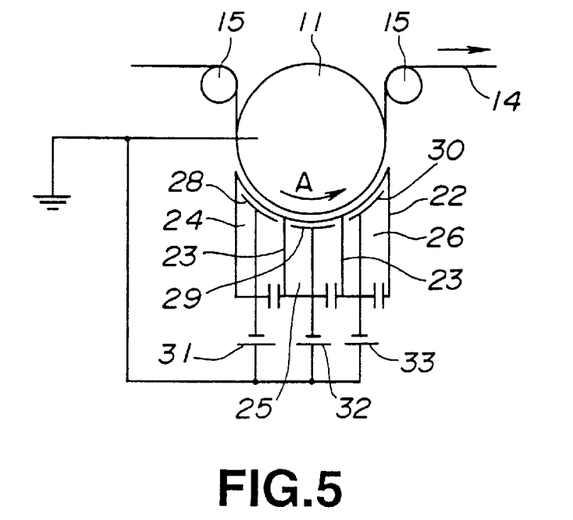
FIG. 5 is a schematic view showing still another example of a CVD device for forming a carbon protective layer.

Although separate reaction tubes may be employed for forming the lower, upper or intermediate layers in this case, it is also possible to have the inside of a reaction tube 22 of a larger capacity partitioned into three sections 24 to 26 by partition plates 23 as shown in FIG. 4 and to use these three sections as reaction tubes for the lower layer, intermediate layer and the upper layer. In particular, three reaction tubes are required for forming the intermediate layer 6 in addition to the lower layer 4 and the upper layer 5. In such case, it is difficult to use separate reaction tubes due to limitations on the mounting space.

If the partition plates are used in this manner for defining the reaction sections, a sole discharge electrode 27 may be provided for extending over the respective reaction sections so as to be used in common for the lower layer, intermediate layer and the upper layer, as shown in FIG. 4. If appropriate impressed voltages differ from one section to another, it is also possible to provide separate discharge electrodes 28 to 30 for the respective sections 24 to 26, so that desired voltages will be applied by dc power sources 31 to 33, respectively.

While the carbon protective film 3, having the rust-proofing and lubricating properties, is provided in the present invention on the thin magnetic metal layer 2, the non-magnetic substrate 1 or the thin magnetic metal film 2 may be those customarily used for this type of the magnetic recording medium.

Thus the non-magnetic substrate 1 may be formed of light metals, such as Al alloys, or ceramics, such as alumina glass, in addition to polyesters, such as polyethylene terephthalate, polyolefins, such as polyethylene or polypropylene, cellulose derivatives, such as cellulose triacetate, cellulose diacetate or cellulose butyrate, vinyl resins, such as polyvinyl chloride or polyvinylidene chloride, or high molecular materials, such as polycarbonate, polyimide or polyamide. If a tough material, such as Al alloy or alumina glass, is used for the non-magnetic substrate, the substrate surface may be hardened by forming an Ni—P coating film or an oxide film such as by almite processing.

The thin magnetic metal layer 2 may be exemplified by an inplane magnetic recording type thin magnetic metal layer formed of metals, such as Fe, Co or Ni, Co—Ni based alloys, Co—Pt based alloys, Co—Pt—Ni based alloys, Fe—Co based alloys, Fe—Ni based alloys, Fe—Co—Ni based alloys, Fe—Ni—B based alloys, Fe—Co—B based alloys, or Fe—Co—Ni—B based alloys, or a perpendicular magnetic recording type thin magnetic metal layer formed of Co—Cr based alloys, may be employed.

If the thin magnetic metal layer 2 is the inplane recording type thin magnetic metal layer 2, an underlying layer of a low-melting non-magnetic material, such as Bi, Sb, Pb, Sn, Ga, In, Ge, Si or Ti is formed on the non-magnetic substrate and a magnetic metal material may be formed on the underlying layer from a perpendicular direction by vacuum-deposition or sputtering for forming the thin magnetic metal layer. If the magnetic metal material is deposited on the underlying layer, the low-melting non-magnetic material of the underlying layer is diffused into the thin magnetic metal film for eliminating the orientation properties of the thin magnetic metal layer for assuring inplane isotropy and improving coercivity.

The basic construction of the recording medium as described above may be modified further within the scope of the invention. For example, a back-coating layer may be provided on the surface of the non-magnetic substrate opposite to its surface provided with the magnetic layer. This back-coating layer is such a layer in which are dispersed fine carbonaceous powders for according electrical conductivity to the organic binder or inorganic pigments for controlling surface roughness thereof and is provided for improving the running performance of the recording medium. A prime coating layer may also be formed below the magnetic layer for controlling surface properties of the magnetic layer.

The present invention will be explained further with reference to Examples based upon experimental results.

EXAMPLE 1

In the present Example 1, a magnetic tape having a thin magnetic metal layer on a non-magnetic substrate and also having a protective layer of a diamond-shaped carbon film exhibiting lubricating properties on its surface portion was prepared as described below.

First, a prime coating layer composed of fine silica particles 12 nm in particle size and a binder was formed on a polyethylene terephthalate (PET) film 10 $\mu$m in thickness so that the fine silica particles will have the density equal to $12/\mu m^2$. Subsequently, a thin magnetic metal film with a film thickness of 0.15 $\mu$m was formed by vacuum deposition using Co as a source of vacuum deposition. The thin magnetic metal film was formed under the conditions of the incident angle of vapor-deposited particles of 45 to 90°, an introduced amount of oxygen of $3.3 \times 10^{-6}$ m$^3$/sec and the vacuum during vacuum deposition of $7 \times 10^{-2}$ Pa.

The coercivity Hc and the residual magnetic flux density Br of the thin magnetic metal film were adjusted to 110 kA/m and 0.45 T by introducing oxygen for partially oxidizing Co.

A protective film formed by a diamond-shaped carbon film carrying P and S is then formed. However, the explanation is first directed to a plasma CVD apparatus employed for film formation.

Figure 6:
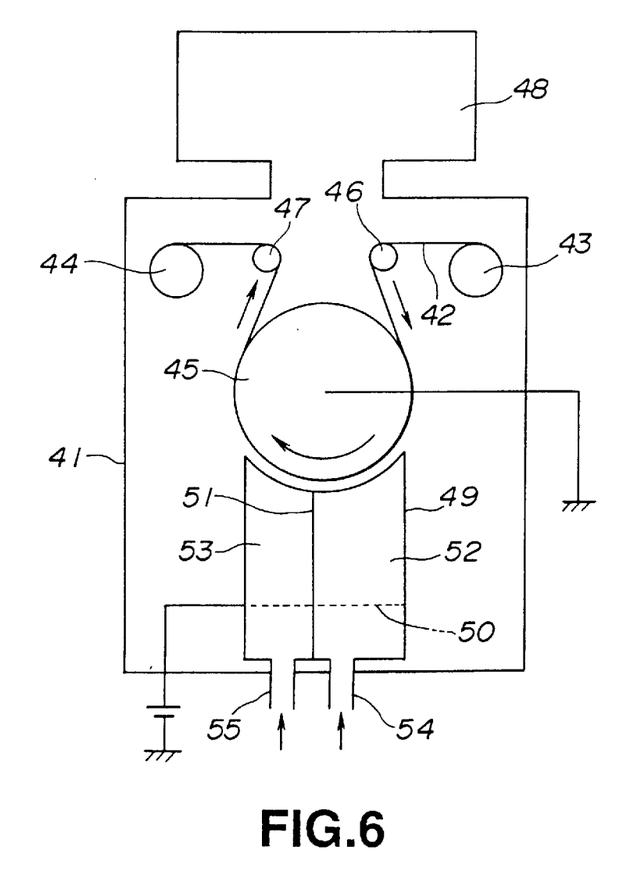
FIG. 6 is a schematic view showing yet another example of a CVD device for forming a carbon protective layer.

Referring to FIG. 6, a feed roll 43 and a take-up roll 44 are provided within a vacuum chamber 41 the inside of which is maintained in vacuum by evacuation using an evacuation system 48. A tape 42 having formed thereon a thin magnetic metal film on a non-magnetic substrate is adapted to run sequentially from the feed roll 43 towards the take-up roll 44.

Partway on the travelling path of the tape 42 from the feed roll 43 towards the take-up roll 44 is arranged a cylindrical can 45 larger in diameter than the rolls 43, 44.

The cylindrical can 45 is adapted for pulling a magnetic tape downwards in FIG. 6. A cooling device, not shown, is provided in the cylindrical can 45 for prohibiting the tape 42 from being deformed due to rise in temperature.

The feed roll 43, take-up roll 44 and the cylindrical can 45 are formed as cylinders having lengths substantially equal to the width of the tape 42. The cylindrical can 45 has a diameter equal to 60 cm.

With the above-described arrangement of the plasma CVD apparatus, the tape 42 is sequentially fed out from the feed roll 43 so as to travel along the peripheral surface of the cylindrical scan 45 until being taken up on the take-up roll 44.

Between the feed roll 43 and the cylindrical can 45 and between the cylindrical can 45 and the take-up roll 44 are arranged guide rolls 46 and 47 smaller in diameter than the rolls 43, 44, respectively, for applying pre-set tension on the tape 42 running from the feed roll 43 to the take-up roll 44 via the cylindrical can 45, in order to allow for smooth running of the tape 42.

Below the cylindrical can 45 is mounted a gas reaction tube 49 within which is arranged a meshed metallic electrode 50. The gas reaction tube 49 has an opening having a curved surface running substantially parallel to the peripheral surface of the cylindrical can 45. To this electrode 50 may be applied an electrical voltage of 500 to 2000 V.

The gas reaction tube 49 has a width substantially equal to the width of the cylindrical can 45 facing thereto and is formed as a regular parallelepiped having a height of 20 cm and a long side of 10 cm extending along the running direction of the tape 42. The gas reaction tube 49 is formed as a quartz tube, a pyrex glass tube or a tube of a plastic material.

The inside of the gas reaction tube 49 is divided by a partition plate 51 into a section 52 facing the upstream side of the cylindrical can 45 and a section 53 facing the downstream side thereof. To these sections 52, 53 are connected a gas supply conduit 54 for supplying a hydrocarbon based compound and a gas conduit 55 for supplying a lubricant compound, respectively.

Thus, if the gas of the hydrocarbon-based compound and the gas of the lubricant compound are supplied via the gas supply conduits 54, 55, respectively, as the pre-set dc voltage is applied to the electrode 50, these gases traverse the mesh of the electrode 50 to undergo a pre-set reaction. The resulting decomposition compounds are continuously deposited on the surface of the tape 42 running along the peripheral surface of the cylindrical can 45.

For forming the protective film of a diamond-shaped carbon film actually endowed with lubricating properties, using the above-described plasma CVD apparatus, the tape 42, comprised of a thin magnetic metal film formed on the non-magnetic substrate, was run at a velocity of 7 m/min along the peripheral surface of the cylindrical can 45, as gasified toluene as the gas of the hydrocarbon based compound was supplied at a flow rate of 4 sccm via the gas supply tube 54 and as gasified thiophsphite as the gasified lubricant compound was supplied at a flow rate of 4 sccm via the gas supply tube 55. The internal pressures in the sections 52 and 53 of the gas reaction tube 49 were both set to 13.3 Pa.

A dc voltage of 1.5 Kv was applied to the electrode 50 for producing glow discharge for decomposing toluene and thiophosphite in the sections 52 and 53, respectively, for depositing the respective decomposition products on the surface of the running tape 42.

In this manner, a protective film as the diamond-shaped carbon was deposited on the surface of the thin magnetic metal film to a thickness of 10 nm.

Since the tape 42 traverses an area facing the section 53 wherein thiophosphite decomposition occurs, after traversing the area facing the section 52 where toluene decomposition occurs, the lubricating properties derived from the decomposition products of thiophosphite are accorded to the surface portion of the resulting protective film.

The tape now having the protective film on the thin magnetic metal film was cut to a width of 8 mm to complete the magnetic tape as a sample tape of Example 1.

Comparative Example 1

A magnetic tape, a sample tape of Comparative Example 1, was produced for comparison sake in the same way as in Example 1, except that no gas was supplied via the gas supply conduit 55 and gasified toluene only was supplied via the gas supply tube 54 at a flow rate of 4 sccm, with the pressure in the section 52 in the gas reaction tube 49 being set to 13.3 Pa.

Evaluation of Characteristics

Recording/reproduction was carried out on the respective sample tapes prepared as described above, using an 8 mm video deck carrying a sendust head, having a track width of 20 $\mu$m, manufactured by SONY CORPORATION under the trade name of CVD-1000, with the minimum recording wavelength of 0.5 $\mu$m, for measuring shuttle durability, still durability and frictional coefficient.

The shuttle durability was evaluated by recording signals on sample tapes under conditions of 20° C. 60% RH, measuring the output level after 100 times of playback running and finding a relative value based upon the initial output level set to 0 Db.

The still durability was evaluated as time which elapsed until playback output was lowered by 3 dB as a result of still reproduction under the same condition as described above. The still durability was evaluated at arbitrary 20 points of sample tapes. The results are shown in Table 1.

|  | shuttle durability | still durability | frictional coefficient |
| --- | --- | --- | --- |
| Ex.1 | −1.0 dB | 2 hours or longer | 0.20 |
| Comp. Ex. 1 | −4 to −5 dB | 5 to 20 minutes | 0.30 |

It is seen from Table 1 that, with the sample tape of Comparative Example 1, an output was lowered by as much as 4 to 5 dB as a result of 100 times of reproduction running, while the time until lowering of the playback output by 3 dB on still reproduction was as short as 5 to 20 minutes, thus exhibiting significant variations. Conversely, the sample tape of Example 1 was low in frictional coefficient and superior in shuttle durability while exhibiting stable still durability amounting to tow hours or longer at optional 20 points.

It is seen from the above results that, although sufficient durability cannot be developed if only the diamond-shaped carbon film is formed as the protective film, significant rise in durability may be achieved if thiophosphite gas is supplied during formation of the protective film for forming a diamond-shaped carbon film endowed with lubricating properties.

EXAMPLE 2

A $Co_{80}$—$Ni_{20}$ alloy film was first formed by vacuum deposition on a polyethylene terephthalate (PET) film.

Next, a lower layer of a protective film was formed by CVD on the magnetic layer using a mixed gas of naphthalene diol (rust-proofing agent) and toluene as a film-forming gas. Then, an upper layer of the protective film was formed, using a mixed gas of triethyl thiophosphite (lubricant) and toluene as a film-forming gas, for preparing a magnetic tape having a carbon protective film made up of the upper and lower layers.

The naphthalene diol/toluene mixed gas was prepared by adding naphthalene diol in an amount of 10 wt % equivalent as weighed using a minute liquid amount weighing apparatus to liquid toluene and gasifying the entire product. Similarly, the triethyl thiophosphite (lubricant)/toluene was prepared by adding naphthalene diol in an amount of 10 wt % equivalent as weighed using a minute liquid amount weighing apparatus to liquid toluene and gasifying the entire product. The film-forming conditions by CVD included using, as the film-forming gas, a mixed gas of toluene/naphthalene diol, for a lower layer, a mixed gas of toluene/triethyl thiophosphite, for an upper layer, an electrical voltage of 2 kV, vacuum of 1– Pa, a film thickness of 10 nm and a PET film as a substrate.

EXAMPLE 3

A magnetic tape was prepared except that an intermediate carbon layer was formed between the upper and lower layers of the protective film, using a toluene gas alone as a film-forming gas, for forming a three-layer carbon protective film.

Comparative Example 2

A magnetic tape was produced in the same way as in Example 2 except that a one-layer carbon protective film was formed using a toluene gas alone as a film-forming gas and a hexane solution of naphthalene diol and a hexane solution of ethyl thiophosphite were coated thereon using a dipping method and subsequently were dried in situ. The coating amount of ethyl thiophosphite was 10 mg/m$^2$.

Of the magnetic tape, thus produced, thin film thickness Hv, still time, level down, frictional coefficient RT and deterioration in intensity of magnetization on storage were checked. The results are shown in Table 2.

The level down and still time were measured using an 8 mm video deck manufactured by SONY CORPORATION under the trade name of CVD 1000. On the other hand, the deterioration in intensity of magnetization on storage was evaluated by storing the magnetic tape at a temperature of 65° C. and a relative humidity (RT) of 90% for one week and measuring the intensity of magnetization before and after storage using a vibrated sample type magnetometer (VSM). The numerical figures of the deterioration in intensity of magnetization in Table 2 correspond to the intensity of magnetization after storage less the intensity of magnetization before storage.

TABLE 2

|  | Ex. 2 | Ex. 2 | Comp. Ex. 2 |
| --- | --- | --- | --- |
| thin film hardness (Hv) | 900 | 1,000 | 1,000 |
| still time (hours) | >200 | >300 | >100 |
| level down (after 100 passes) in dB | −0.1 | −0.1 | −0.2 |
| frictional coefficient (RT) | 0.15 | 0.15 | 0.20 |
| deterioration in magnetization (%) | −3 | −3 | −10 |

It is seen from Table 2 that, as compared to the magnetic tape of Comparative Example 2 in which the rust-proofing and lubricating properties were not accorded to the carbon protective film and a rust-proofing agent and the lubricant were coated on the carbon protective film, the magnetic tape of Examples 2 and 3 in which the rust-proofing and lubricating properties were accorded to the carbon protective film exhibit long still time, low level down and low values of frictional coefficient. In addition, the magnetic tape of Example 2 exhibits deterioration in magnetization after storage under high temperature high humidity environment only to a lesser extent.

It is seen from this that it is more effective to directly accord the rust-proofing and lubricating properties to the carbon protective film than top-coating the rust-proofing agent and the lubricant on the carbon protective film in improving the running performance, durability and preservability of the tape.

In addition, comparison of the magnetic tape of Example 2 to the magnetic tape of Example 3 reveals that the magnetic tape of Example 3, in which the carbon protective layer is of a three-layered structure including a pure carbon intermediate layer, is higher in thin film hardness and in still durability than the magnetic tape of Example 2 having a two-layer construction of the carbon protective layer.

It is seen from above that interposition of the pure carbon layer as an intermediate layer between the lower layer having rust-proofing performance and the upper layer having lubricating performance further improves durability of the recording medium.

EXAMPLE 4

In the present Example, a magnetic tape was prepared by forming a protective film of diamond-shaped carbon by CVD using a toluene/catechol mixed gas on a thin magnetic metal layer.

Specifically, a thin magnetic metal film having a film thickness of 0.15 μm was formed by vacuum deposition on a polyethylene terephthalate (PET) film, with a thickness of 10 μm, using $Co_{80}$—$Ni_{20}$ as a source of vapor deposition. The thin magnetic metal film was formed under the conditions of an incident angle of vapor-deposited particles of 45 to 90°, an inlet amount of oxygen of $3.3 \times 10^{-6}$ m$^3$/sec and the vacuum during vapor deposition of $7 \times 10^{-2}$ Pa.

By introducing oxygen for partially oxidizing $Co_{80}$—$Ni_{20}$, the thin magnetic metal film was adjusted to coercivity Hc and residual magnetic flux density Br of the thin magnetic metal film of 110 kA/m and 0.45 T, respectively.

Figure 7:
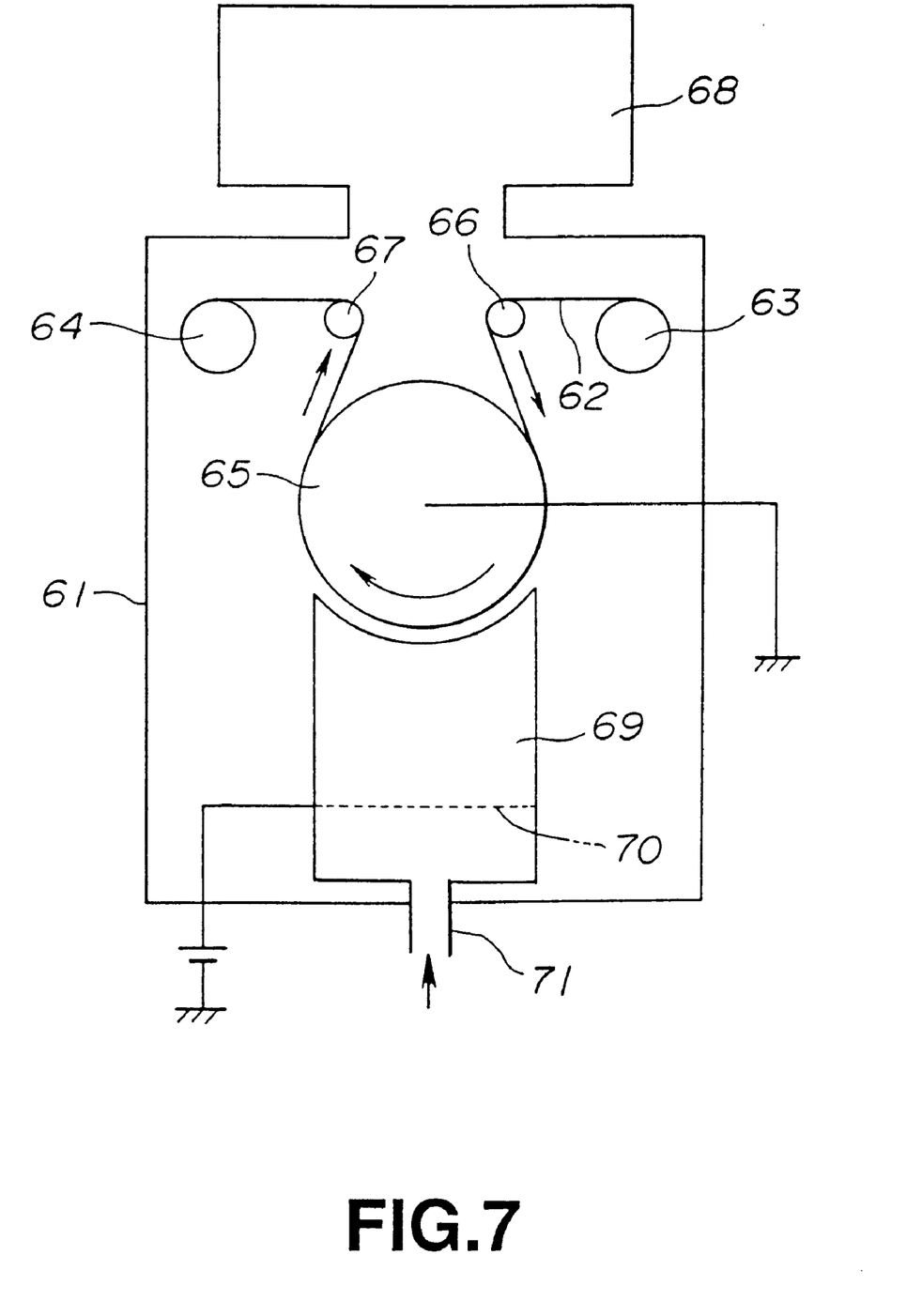
FIG. 7 is a schematic view showing a further example of a CVD device for forming a carbon protective layer.

The plasma CVD apparatus, employed for forming a protective film, is now explained.

Referring to FIG. 7, a feed roll 63 and a take-up roll 64 are arranged within a vacuum chamber 61, the inside of which is evacuated by an evacuation system 68 to a vacuum state. A tape 62, comprised of a thin magnetic metal film formed on a non-magnetic substrate as described above, is adapted to run from the feed roll 62 towards the take-up roll 64.

At a mid portion of the travel path of the tape 62 from the feed roll 63 towards the take-up roll 64 is arranged a cylindrical can 65 larger in diameter than the rolls 63, 64.

The cylindrical can 65 is adapted for pulling a magnetic tape downwards in FIG. 7. A cooling device, not shown, is provided in the cylindrical can 65 for prohibiting the tape 62 from being deformed due to rise in temperature.

The feed roll 63, take-up roll 64 and the cylindrical can 65 are formed as cylinders having lengths substantially equal to the width of the tape 62. The cylindrical can 65 has a diameter equal to 60 cm.

With the above-described arrangement of the plasma CVD apparatus, the tape 62 is sequentially fed out from the feed roll 63, so as to travel along the peripheral surface of the cylindrical can 65 until being taken up on the take-up roll 64.

Between the feed roll 63 and the cylindrical can 65 and between the cylindrical can 65 and the take-up roll 64 are arranged guide rolls 66 and 67 smaller in diameter than the rolls 63, 64, respectively, for applying pre-set tension on the tape 62 running from the feed roll 63 to the take-up roll 64 via the cylindrical can 65, in order to allow smooth running of the tape 46.

Below the cylindrical can 65 is mounted a gas reaction tube 69 within which is arranged a meshed metallic electrode 70. The gas reaction tube 69 has an opening having a curved surface running substantially parallel to the peripheral surface of the cylindrical can 65. To this electrode 70 may be applied an electrical voltage of 500 to 2000 V.

The gas reaction tube 69 has a width substantially equal to the width of the cylindrical can 65 facing thereto and is formed as a regular parallelepiped having a height of 20 cm and a long side of 10 cm extending along the running direction of the tape 62. The gas reaction tube 69 is formed as quartz tube, pyrex glass tube or a tube of a plastic material. To the gas reaction tube 69 is connected a gas supply conduit 71 for supplying the gas into the inside thereof.

Thus, if a mixed gas of the hydrocarbon-based compound and the lubricant compound is supplied via the gas supply conduit 71, as the pre-set dc voltage is applied to the electrode 70, these gases traverse the mesh of the electrode 70 to undergo a pre-set reaction, the decomposition compounds of which are continuously deposited on the surface of the tape 62 running along the peripheral surface of the cylindrical can 65.

For forming the protective film, using the above-described plasma CVD apparatus, the tape 62, comprised of a thin magnetic metal film deposited on a non-magnetic substrate, was run at a velocity of 3 m/min along the peripheral surface of the cylindrical can 65, as gasified toluene admixed with 10 wt % of catechol was supplied at a flow rate of 20 sccm via the gas supply tube 71. The internal pressure in the vacuum chamber 61 was set to 10 Pa.

A dc voltage of 2 kV was applied to the electrode 70 for inducing glow discharge for depositing decomposition products of the mixed gas on the surface of the running tape 62.

In this manner, a protective film of diamond-shaped carbon was deposited on the surface of the thin magnetic metal film to a thickness of 10 nm.

The tape now having the protective film on the thin magnetic metal film was cut to a width of 8 mm to complete the magnetic tape as a sample tape of Example 1.

EXAMPLE 5

In the present Example, naphthalene diol was employed in place of catechol during formation of a protective film.

Specifically, a magnetic tape was prepared to produce sample tape of Example 5 by forming a protective film in the same way as in Example 4 except adding 10 wt % of naphthalene diol to toluene, gasifying the resulting mixture and supplying the resulting gas via the gas reaction tube 71 into the gas reaction tube 69 at a flow rate of 20 sccm.

Comparative Example 3

For comparison, naphthalene diol was coated after formation of a protective film for producing a magnetic tape.

Specifically, a protective film was formed in the same way as in Example 4 except gasifying only toluene and supplying the resulting gas at a flow rate of 20 sccm via gas supply tube 71 and setting the pressure within the vacuum chamber 61 to 10 Pa. After coating naphthalene diol in an amount of 20 mg/m$^2$, a magnetic tape was completed by cutting as in Example 4 to provide a sample tape of Comparative Example 3.

Comparative Example 4

A magnetic tape was prepared without employing aromatic hydroxy compounds, such as catechol or naphthalene dial, during nor after formation of the protective film.

Specifically, a protective film was formed in the same way as in Example 4 except gasifying only toluene and supplying the resulting gas at a flow rate of 20 sccm via gas supply tube 71 and setting the pressure within the vacuum chamber 61 to 10 Pa. The magnetic tape was subsequently prepared without coating an aromatic hydroxy compound to complete a sample tape of Comparative Example 4.

Evaluation of Characteristics

Of the sample tapes, produced as described above, shuttle durability, still durability and rust-proofing properties were checked.

For measuring shuttle durability and still durability, recording/reproduction was carried out on the respective sample tapes prepared as described above, using an 8 mm video deck carrying a sendust head, having a track width of 20 $\mu$m, manufactured by SONY CORPORATION under the trade name of CVD-1000.

The shuttle durability was evaluated by recording signals on sample tapes in an atmosphere of 20° C. 60% RH., measuring the output level after 100 times of playback running and finding the relative value with respect to the initial output level set to 0 dB. The still durability was evaluated as time which elapsed until playback output was lowered by 3 dB as a result of still reproduction in the same atmosphere as above.

In finding the rust-proofing properties, the sample tapes were allowed to stand for seven days in an atmosphere of 65° C. and a relative humidity (RH) of 90% and measurement of the initial amount of magnetization and the intensity of magnetization after allowing to stand were measured using a vibrated sample type measurement device (VSM) for measuring the magnetic properties. The rust-proofing properties were then found in terms of a rate of deterioration in the intensity of magnetization due to allowing to stand in accordance with the equation:

(rate of deterioration in intensity of magnetization in percent)=
($\phi r_0 - \phi r_0$)/$\phi r_0 \times 100$ where $\phi r_0$ and $\phi r_1$ stand for initial intensity of magnetization and intensity of magnetization after allowing to stand, respectively. These results are shown in Table 3.

TABLE 3

| | hardness of protective film | shuttle durability (dB) | still durability (hours) | rate of deterioration of residual flux density (%) |
|---|---|---|---|---|
| Ex. 4 | 900 | −0.2 | >100 | −3 |
| Ex. 5 | 900 | 0.2 | >100 | −5 |
| Comp. Ex. 3 | 900 | −0.2 | >100 | −10 |
| Comp. Ex. 4 | 900 | −0.2 | >100 | −20 |

In Table 3, the hardness of the protective film in each sample tape (Hv) is also shown.

It is seen from Table 4 that, in each sample tape, the protective film is superior in hardness and has sufficient values of shuttle durability and still durability. However, the sample tape of Comparative Example 4, not holding a rust-proofing agent, exhibits an extremely high rate of deterioration, while the sample tape of Comparative Example 3, in which the rust-proofing agent was applied after formation of the rust-proofing agent, is lower in the rate of deterioration of the intensity of magnetization than in Example 4, however, the lowering in the rate of deterioration is not fully satisfactory. Conversely, with the sample tapes of Examples 4 and 5, the rate of deterioration in the intensity of magnetization becomes extremely low.

It is seen from the above results that, by supplying a mixed gas of a hydrocarbon based compound and an aromatic hydroxy compound during formation of a protective film, a magnetic tape may be obtained which is superior in both the durability and rust-proofing properties.

The present invention may be modified with respect to details given in the above given Examples. For example, the gas reaction tube of a plasma CVD apparatus for forming a protective film may be divided as shown in FIG. 6 into two portions by a partition plate, as in Example 1, and gas supply conduits provided for supplying respective gases into these two sections. In this case, it suffices if a gas of a hydrocarbon based compound, such as toluene, is supplied via the section facing an upstream portion of a tape running along the peripheral surface of the cylindrical can, with a gas of an aromatic hydrocarbon based gas, such as catechol or naphthalene diol, being then supplied via the section facing the downstream side of the tape.

What is claimed is:

1. A magnetic recording medium comprising:

a non-magnetic substrate;

a magnetic thin film formed on the substrate; and a carbon protective film formed therein on the thin magnetic film, the carbon protective film including a lubricant that can be added to the carbon protective film without using a solvent and in a vapor form during a chemical vapor deposition of the carbon protective film onto the magnetic thin film, the lubricant being in an amount effective to lubricate sliding action of a recording head on a top surface of the carbon protective film; wherein, the lubricant is a thiophosphite; and the carbon protective film is formed by chemical vapor deposition during which lubricant is added in vapor form to a hydro carbon based compound used as a starting gas for the carbon protective film.

2. The magnetic recording medium of claim 1 wherein the thiophosphite is tristearyl thiophosphite.

3. The magnetic recording medium of claim 1 wherein the thiophosphite is trimyristyl thiophosphite.

4. The magnetic recording medium of claim 1 wherein the thiophosphite is trilauryl thiophosphite.

5. The magnetic recording medium of claim 1 wherein the thiophosphite is tribenzyl thiophosphite.

6. A magnetic recording medium comprising:

a non-magnetic substrate;

a magnetic thin film formed on the substrate; and a carbon protective film formed therein on the thin magnetic film, the carbon protective film including a lubricant that can be added to the carbon protective film without using a solvent an in a vapor form during a chemical vapor deposition of the carbon protective film onto the magnetic thin film, the lubricant being in an amount effective to lubricate sliding action of a recording head on a top surface of the carbon protective film; wherein, the lubricant is tricresyl phosphite, and the carbon protective film is formed by chemical vapor deposition during which lubricant is added in vapor form to a hydrocarbon based compound used as a starting gas for the carbon protective film.

7. A magnetic recording medium comprising:

a non-magnetic substrate;

a magnetic thin film formed on the substrate; and a carbon protective film formed therein on the thin magnetic film, the carbon protective layer including a lubricant that can be added to the carbon protective film without using a solvent an in a vapor form during a chemical vapor deposition of the carbon protective film onto the magnetic thin film, the lubricant being in an amount effective to lubricate sliding action of a recording head on a top surface of the carbon protective film; wherein, the lubricant is trioleyl phosphite, and the carbon protective film is formed by chemical vapor deposition during which lubricant is added in vapor from to a hydrocarbon based compound used as a starting gas for the carbon protective film.

8. A magnetic recording medium comprising:

a non-magnetic substrate;

a magnetic thin film formed on the substrate; and a carbon protective film formed on the thin magnetic film, the carbon protective film including therein an antioxidant which can be added to the carbon protective film without a solvent and in vapor form during a chemical vapor deposition of the carbon protective film onto the magnetic thin metal film, the antioxidant being in an amount effective to inhibit oxidation of the magnetic thin film layer;

wherein, the antioxidant is an aromatic hydroxy compound, and the carbon protective film is formed by chemical vapor deposition which lubricant is added in a vapor form to a hydrocarbon based compound used as a starting gas for the carbon protective film.

9. The magnetic recording medium of claim 8 wherein the aromatic hydroxy compound is phenol.

10. The magnetic recording medium of claim 8 wherein the aromatic hydroxy compound is catechol.

11. The magnetic recording medium of claim 8 wherein the aromatic hydroxy compound is resorcin.

12. The magnetic recording medium of claim 8 wherein the aromatic hydroxy compound is hydroquinone.

13. The magnetic recording medium of claim 8 wherein the aromatic hydroxy compound is orcin.

14. The magnetic recording medium of claim 8 wherein the aromatic hydroxy compound is urushiol.

15. The magnetic recording medium of claim 8 wherein the aromatic hydroxy compound is pyrogallol.

16. The magnetic recording medium of claim 8 wherein the aromatic hydroxy compound is phloroglucin.

17. The magnetic recording medium of claim 8 wherein the aromatic hydroxy compound is hydroxy hydroquinone.

18. The magnetic recording medium of claim 8 wherein the aromatic hydroxy compound is bisphenol A.

19. The magnetic recording medium of claim 8 wherein the aromatic hydroxy compound is naphthol.

20. The magnetic recording medium of claim 8 wherein the aromatic hydroxy compound is naphthalene diol.

21. The magnetic recording medium of claim 8 wherein the aromatic hydroxy compound is binaphthol.

22. The magnetic recording medium of claim 8 wherein the aromatic hydroxy compound is antrol.

23. The magnetic recording medium of claim 8 wherein the aromatic hydroxy compound is an anthrahydroquinine.

24. The magnetic recording medium comprising:
   a non-magnetic substrate;
   a magnetic metal thin film formed on the substrate; and
   a carbon protective film formed on the magnetic metal thin film, the carbon protective film comprising a first carbon layer having therein a lubricant and a second carbon layer having an antioxidant, both lubricant and antioxidant can be added to the carbon protective film without the use of solvent and in vapor form during chemical vapor deposition of the carbon protective film onto the thin magnetic metal film, the antioxidant being an aromatic hydroxy compound.

25. The magnetic recording medium of claim 24 wherein the lubricant is a thiophosphite.

26. The magnetic recording medium of claim 24 wherein the carbon protective film is a diamond-like carbon film.

27. The magnetic recording medium of claim 24 wherein the aromatic hydroxy compound is catechol.

28. The magnetic recording medium of claim 24 wherein the aromatic hydroxy compound is naphthalene diol.

29. The recording medium of claim 24 further comprising a third carbon layer positioned between the first and second carbon layers.

30. The recording medium of claim 24, wherein the medium is tape.

* * * * *